(12) United States Patent
Eissara et al.

(10) Patent No.: US 9,375,803 B2
(45) Date of Patent: Jun. 28, 2016

(54) STUD JOINING APPARATUS

(71) Applicant: NEWFREY LLC, Newark, DE (US)

(72) Inventors: Bah Eissara, Giessen (DE);
Klaus-Gisbert Schmitt, Giessen (DE)

(73) Assignee: NEWFREY LLC, New Britain, CT (US)

( * ) Notice: Subject to any disclaimer, the term of this patent is extended or adjusted under 35 U.S.C. 154(b) by 568 days.

(21) Appl. No.: 13/799,838

(22) Filed: Mar. 13, 2013

(65) Prior Publication Data

US 2014/0034616 A1    Feb. 6, 2014

(30) Foreign Application Priority Data

Aug. 1, 2012   (DE) .......................... 10 2012 015 121

(51) Int. Cl.
| | |
|---|---|
| *B23K 11/02* | (2006.01) |
| *B23K 11/36* | (2006.01) |
| *B08B 7/00* | (2006.01) |
| *B23K 9/20* | (2006.01) |
| *B23K 9/235* | (2006.01) |

(52) U.S. Cl.
CPC ............... *B23K 11/02* (2013.01); *B08B 7/0071* (2013.01); *B23K 9/20* (2013.01); *B23K 9/201* (2013.01); *B23K 9/235* (2013.01); *B23K 11/36* (2013.01)

(58) Field of Classification Search
CPC ........ B23K 11/02; B23K 11/36; B23K 9/235; B23K 9/20; B23K 9/201; B23K 9/202; B08B 7/0071
See application file for complete search history.

(56) References Cited

U.S. PATENT DOCUMENTS

| | | | |
|---|---|---|---|
| 3,278,720 A | 10/1966 | Dixon | |
| 3,835,284 A * | 9/1974 | Gstohl | .................. B23K 9/202 219/98 |
| 6,762,392 B1 | 7/2004 | Krengel et al. | |
| 7,064,289 B2 * | 6/2006 | Schmidt | ............... B23K 9/1056 219/98 |
| 7,926,161 B2 * | 4/2011 | Gerhardt | .................. B23K 9/20 29/407.1 |
| 8,344,280 B2 * | 1/2013 | Schneider | ................ B23K 9/20 219/98 |
| 8,464,617 B2 * | 6/2013 | Zaloga | .................. B25B 21/002 29/525.02 |
| 2003/0019847 A1 | 1/2003 | Schmitt et al. | |
| 2005/0072765 A1 | 4/2005 | Schmitt et al. | |
| 2006/0118527 A1 | 6/2006 | Schmitt et al. | |
| 2009/0014422 A1 | 1/2009 | Miklos et al. | |
| 2010/0176093 A1 | 7/2010 | Schmitt | |

FOREIGN PATENT DOCUMENTS

| | | |
|---|---|---|
| DE | 102008028272 A | 12/2009 |
| DE | 102009053762 A | 6/2010 |

* cited by examiner

*Primary Examiner* — Jianying Atkisson
(74) *Attorney, Agent, or Firm* — Michael P. Leary

(57) ABSTRACT

A welding apparatus for joining a weldable fastening element onto a workpiece by a welding process, wherein the welding apparatus comprises: an electric welding power source; a fastening element holding device for holding the fastening element during welding; a first drive device for moving the fastening element holding device along a first axis; a cleaning electrode holding device for holding a cleaning electrode along a second axis; and wherein the cleaning electrode is connectable to the electric welding power source. The fastening element holding device and the cleaning electrode holding device are mounted on a common tool carrier and the tool carrier is movable on a joining head by a tool carrier drive from a joining position to a cleaning position, and in the joining position the first axis defines a joining axis, and in the cleaning position the second axis is aligned with the joining axis.

7 Claims, 3 Drawing Sheets

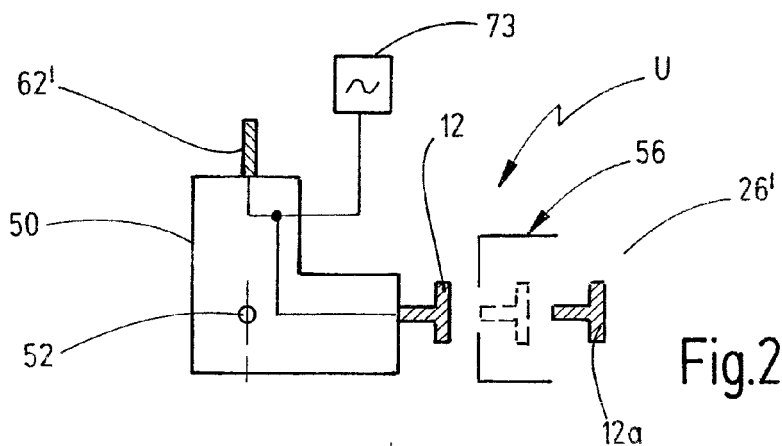
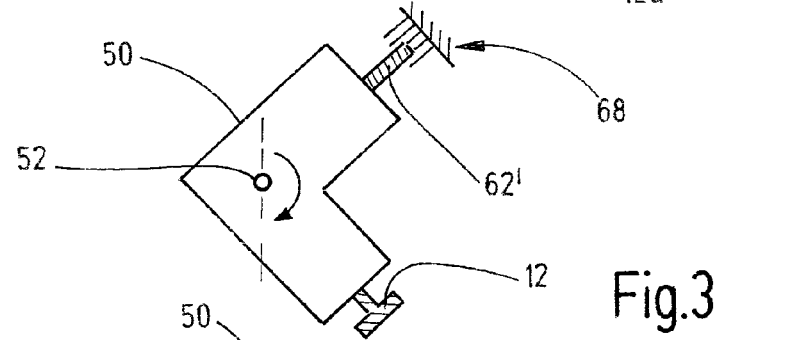
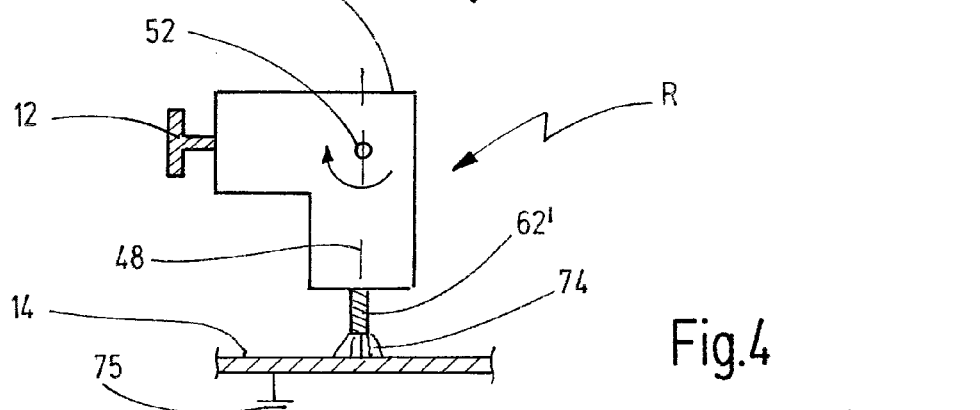
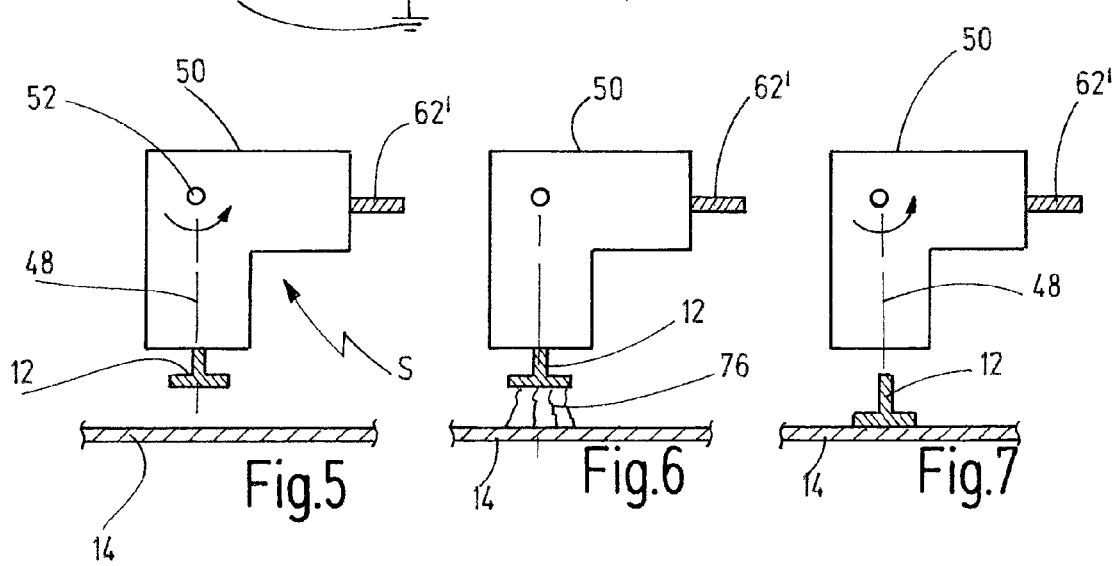

STUD JOINING APPARATUS

CROSS-REFERENCE TO RELATED APPLICATION

This application claims priority from German Patent Application No. DE 102012015121.7, filed on Aug. 1, 2012, the disclosure of which is incorporated herein by reference.

BACKGROUND OF THE INVENTION

The present invention relates to a method for joining fastening elements such as studs on workpieces such as metal sheets, said method having the steps of preparing a joining surface of a fastening element and/or a joining surface of a workpiece and of bringing the fastening element and the workpiece together in such a manner that the fastening element is joined onto the workpiece, wherein, prior to the joining step, a cleaning step is carried out in order to clean the joining surface of the workpiece.

In addition, the present invention relates to an apparatus for joining fastening elements on workpieces, in particular for carrying out the abovementioned method, said apparatus having a fastening element holding device for holding a fastening element, wherein the fastening element holding device is displaceable along a first axis by means of a drive device.

One joining method of the abovementioned type is, for example, so-called stud welding. With said method, fastening elements, such as studs, nuts or metal strips, are welded at right angles onto a surface of a workpiece, such as a metal sheet, the method being possible with the workpiece being accessible on one side.

Stud welding is used extensively in the area of bodywork construction for motor vehicles, the fastening elements joined on workpieces, such as body sheets, in this way serving, for example, as anchors for clips to which, in their turn, cable looms, fuel lines etc. can be fastened.

The fastening elements and/or the workpieces, in this case, are frequently contaminated, for example by solid lubricant and/or deep-drawing oil, in particular as residue from previously carried out cold working processes. To clean the fastening element or workpiece, it is known from the prior art to conduct a cleaning process prior to the actual stud welding process. In the case of said cleaning process, prior to the generating of the welding arc at a relatively high current intensity, a cleaning arc, which has a lower current intensity, is generated between the workpiece and the fastening element to be welded on. In the case of said cleaning step, the welding surfaces located opposite each other, as a rule, are not yet melted. In this connection, on account of the emission of electrons, the component with negative polarity experiences a certain cleaning temperature rise which results in the combustion of the wetting substances. The residue of said combustion process is then deposited on the component with positive polarity if it does not immediately evaporate. By frequently changing polarity, the surfaces can consequently be cleaned well.

In the case of very thin-walled workpieces with sheet thicknesses of, for example, less than or equal to 1 mm, there is the risk of frequent polarity changes leading to "root penetration", where the workpiece in the region of the welding surface is melted not only on the surface but directly through such that a hole is generated at this position and a stud weld connection is no longer possible.

Said problem is produced in particular when aluminium fastening elements or workpieces are used.

In the prior art, a stud welding method with a pre-conducted cleaning process is described in document EP 1 183 127 B1.

In addition, cleaning metal workpiece surfaces in an inductive manner is known, for example see DE 10 2008 028 272 A1.

Document DE 10 2007 032 067 A1 also makes known a method for cleaning a workpiece surface by means of a cryogenic medium.

Document DE 10 2009 053 762 A1 proposes a cleaning apparatus for a stud welding head, said cleaning apparatus having a pair of brushes.

Dry cleaning, for example by means of acetone, is also known in the prior art.

BRIEF SUMMARY OF THE INVENTION

Against this background, it is an object of the invention to provide an improved joining method and/or an improved joining apparatus which make it possible to pre-clean the surfaces of very thin workpieces, in particular of aluminium, in an efficient manner or to make reliable stud joining processes possible with these types of thin workpieces for the first time.

This object is achieved in the case of the aforementioned method in that the cleaning step includes arranging a cleaning electrode above the joining surface of the workpiece and generating a cleaning arc between the cleaning electrode and the joining surface.

In addition, the above object is achieved in the case of the aforementioned joining apparatus in that the joining apparatus has a cleaning electrode holding device for holding a cleaning electrode, wherein the cleaning electrode holding device is aligned along a second axis and wherein the cleaning electrode held by the cleaning electrode holding device is connectable to an electric power source.

The basic concept of the present invention consequently consists in carrying out a cleaning process by means of a cleaning arc, however, not carrying out said cleaning process using the fastening element subsequently to be joined, but using a cleaning electrode provided especially for this purpose.

The cleaning arc, in this case, can be polarized such that electrons emerge from the workpiece and are then deposited, where applicable, on a surface of the cleaning electrode.

The fastening elements can be made available in a state where they have been pre-cleaned. Consequently, once the cleaning step has been carried out, a stud joining process can be carried out where the joining surface of the workpiece has been cleaned by means of a cleaning arc using a cleaning electrode and where a joining surface of the fastening element can be present free of deposits, such that an optimized joining process can then be carried out with cleaned surfaces.

The cleaning electrode can be an electrode from the same material as the workpiece and/or from the same material as the fastening element to be joined subsequently. The cleaning electrode, however, can also be an electrode from a classic electrode material such as tungsten. The surface of the cleaning electrode facing the workpiece can be smaller than the joining surface of the fastening element, however it can be just as large or larger than the joining surface of the fastening element.

The fastening element can be a nut and can be a sheet part (such as, for example, known by so-called Weldfast® welding). In a particularly preferred manner, however, the fastening element is a joining stud which has a shank and a flange section connecting thereto of the same material. The underside of the flange section, in this case, is realized as a joining surface. The joining surface can be realized as an obtuse-angled conical surface.

The term joining in the present document particularly refers to a welding operation where both the joining or welding surfaces (that of the fastening element and that of the workpiece) are melted such that, when they are joined together, the overall melting is mixed to form an overall melt which provides the positive locking connection once it has cooled.

In general, the term joining, however, can also refer to a method where only one of the welding surfaces is melted. The term preparing in the present document is to be understood such that it also includes, for example, rises in temperature, as occur, for example, when soldering, or the application of adhesive. Accordingly, the term joining can consequently include the fact that the components are connected together without additive or with additive.

The preferred material of the workpiece and of the fastening element is predominantly aluminium, but can also be steel. The workpiece in the present case has a sheet thickness of less than or equal to 1 mm.

The cleaning step in the present case is preferably carried out without any change in polarity. In addition, the preferably following welding step is also preferably carried out without any change in polarity. However, the polarities of the cleaning step and the welding step can be different. A short pause, which, for example, is greater than 10 ms and less than 3 s, in particular greater than 25 ms and less than 2 s, preferably greater than 40 ms and less than 1.5 s, can be provided between the cleaning step and the welding step.

All in all, in a preferred variant it is possible to weld aluminium studs onto thin aluminium sheets without the risk of root penetration or cracking on the rear side of the aluminium sheet. The admissible sheet thickness, in this case, can also be less than 2.00 mm, in particular less than 0.9 mm, and is preferably greater than 0.5 mm.

In the case of the joining apparatus according to the invention, different electric power sources can be provided for the generating of a welding arc and for the generating of the cleaning arc. However, the fastening element which is held in the fastening element holding device and the cleaning electrode which is held in the cleaning electrode holding device are preferably connected to the same electric power source, in particular connected in parallel.

The electric power source, in this case, is preferably realized so as to be adjustable within wide boundaries with regard to the electric current and/or the electric voltage. In addition, polarity changes are preferably realizable by means of the electric power supply apparatus.

The joining apparatus according to the invention can be realized in a cost-efficient manner as simply one additional cleaning electrode holding device has to be provided on a joining head (and where applicable a corresponding electric connection to a power supply). In addition, as a rule, it is not necessary to clean the workpieces in an expensive and time-consuming manner to start with, for example by $CO_2$ snow cleaning and/or laser cleaning. Accordingly, the joining method according to the invention can preferably be carried out without such types of cleaning processes provided upstream. A stud welding method can preferably be a lift ignition welding method where the fastening element is first of all placed in position on the workpiece, a pilot arc is then struck and the fastening element is then lifted off the workpiece in order to strike an arc. As a rule, the current intensity is then increased for generating the welding arc. Once the workpiece and the fastening element have been joined together, the welding arc is short-circuited and the electric power source switched off such that the overall melt can solidify.

As an alternative, it is also possible for the method according to the invention to be carried out in conjunction with the so-called tip ignition welding method, where a tip of a fastening element is placed in position on the workpiece and a high current is then switched on where the tip is evaporated and a welding arc is then generated at the same time as a result of the spacing then set up between the fastening element and the workpiece.

The cleaning electrode can be an electrode provided especially for this purpose. However, it is particularly preferred when the cleaning electrode is formed by the fastening element, as it is also subsequently joined to the workpiece. This means that the variety of parts can be reduced. In addition, it is possible to insert a fastening element into a cleaning electrode holding device in the same manner as such types of fastening elements are inserted into the fastening element holding device. After the cleaning step, the fastening element used as a cleaning electrode is preferably no longer used as a fastening element which is to be welded onto a workpiece. The fastening element used as a cleaning electrode is preferably disposed of after single or multiple use.

The object is consequently completely achieved.

In the case of the method according to the invention, it is particularly preferred when the cleaning arc is generated by the cleaning electrode being placed in position on the workpiece, an electric cleaning current being switched on and the cleaning electrode subsequently being lifted off the workpiece in order to generate the cleaning arc in this manner.

In the case of said variant, the cleaning arc is consequently carried out in an analogous manner to a stud welding process with lift ignition. Consequently, established tool components and processes can be used in order to generate the cleaning arc.

According to a further preferred embodiment, it is preferred when the cleaning electrode is purged after the cleaning step or after a plurality of cleaning steps.

The purging, in this case, can be effected, for example, in a mechanical manner, e.g. by means of a brush or the like.

It is particularly preferred when the cleaning electrode is automatically moved past such a mechanical purging device, such as a brush, when transferring a tool carrier from a cleaning position into a welding position.

According to a further preferred embodiment, the cleaning electrode is exchanged after the cleaning step or after a plurality of cleaning steps.

As it cannot be avoided that the surface of the cleaning electrode gradually "clogs up" in spite of mechanical purging, an exchange of the cleaning electrode after one or several cleaning steps is advantageous, or also when mechanical purging is not able to be carried out.

One aspect of the invention is consequently also the use of a fastening element as a cleaning device in a joining method and/or a joining apparatus of the type according to the invention.

According to a further preferred embodiment, a welding arc and the cleaning arc are generated with different polarity.

In this case, it is preferred when, to generate the cleaning arc, a negative pole is applied to the workpiece and a positive pole is applied to the fastening element. This can ensure that during the cleaning arc electrons emerge from the workpiece and provide a cleaning rise in temperature which can result in the combustion of the wetting substances.

In addition, it is preferred overall in the case of the method according to the invention when the fastening element and the cleaning electrode are arranged on a common tool carrier which is displaced from a cleaning position into a joining position after the cleaning step.

This means that the method according to the invention can be realized with a small amount of expenditure on construction.

In the case of the joining apparatus according to the invention, it is accordingly advantageous when the fastening element holding device and the cleaning electrode holding device are mounted on a common tool carrier.

In this case, it is advantageous in this respect when, by means of a workpiece drive, the tool carrier is movable on a joining head into a joining position in which the first axis is aligned with a joining axis, and is movable into a cleaning position in which the second axis is aligned with the joining axis.

The joining head, in this case, can be guided by a robot for example, the tool carrier being movable on the joining head in a suitable manner in order to realize the movement from joining position into cleaning position and vice versa. The movement of the tool carrier from the cleaning position into the joining position and vice versa can also be carried out by the robot itself.

In some embodiments, the tool carrier, in this case, can also approach a further position, for example a transfer position in which it is possible to insert fastening elements into the fastening element holding device and/or into the cleaning electrode holding device.

According to a preferred embodiment, the tool carrier is realized as a rotary drive.

In this case, the axis of rotation can be aligned at right angles to the first axis and the second axis. As an alternative to this, the axis of rotation of the rotary drive can be aligned parallel to the first axis and to the second axis. Whereas the first axis and the second axis are preferably not arranged parallel to each other in the former case, the first axis and the second axis are preferably arranged parallel to each other in the second case.

According to an alternative embodiment, the tool carrier is realized as a displacement drive.

In this connection, the fastening element holding device and the cleaning electrode holding device can be arranged, for example, on a type of slide which is displaceable back and forth between the cleaning position and the joining position, as a longitudinal drive.

In all the abovementioned embodiments it is possible to realize the tool carrier drive such that said tool carrier drive can also move the tool carrier into a transfer position in which a fastening element can be inserted or transferred from the joining head into the fastening element holding device (and/or into the cleaning electrode holding device).

This means that the supply of fastening elements to the fastening element holding device can be effected in an automatic manner by the fastening elements, for example with the shank in the front, being inserted into the outlet side of the fastening element holding device. This means that the design of the fastening element holding device (and/or of the cleaning electrode holding device) can be simplified as an automated feed does not have to be carried out "from the rear" (that is to say via the side of the respective holding device facing the tool carrier).

In general, it is also possible to fasten the cleaning electrode rigidly on the tool carrier. The movement of the cleaning electrode for generating a cleaning arc can be carried out by the robot itself.

However, it is particularly preferred when the cleaning electrode holding device is displaceable along the second axis by means of a further drive device.

In the case of said embodiment, a cleaning arc can be generated by a lift ignition method by the cleaning electrode first of all being placed in position on the workpiece and, once the cleaning current has been switched on, being lifted off the workpiece in order to strike the cleaning arc.

The further drive device can be realized as a separate drive device. In some variants, however, the drive device for moving the fastening element holding device can also be used for moving the cleaning electrode holding device.

In addition, it is generally possible for the first axis and the second axis to be aligned parallel to each other.

In a preferred variant, however, the first axis and the second axis are aligned with respect to each other at an angle which is less than or equal to 180°, preferably less than or equal to 90° and in particular greater than or equal to 0°, preferably greater than or equal to 15°.

It is particularly preferred when the angle is less than or equal to 45°.

In the case of said embodiment, it is preferred when the tool carrier drive is realized as a rotary drive, the axis of rotation of which extends transversely with respect to the first and to the second axis.

It is obvious that the aforementioned features and the features yet to be explained below are usable not only in the respectively specified combination, but also in other combinations or standing alone, without departing from the framework of the present invention.

BRIEF DESCRIPTION OF THE SEVERAL VIEWS OF THE DRAWINGS

Exemplary embodiments of the invention are shown in the drawing and are explained in detail in the following description, in which drawings:

FIG. 2 shows a tool carrier of the joining apparatus of FIG. 1 in a transfer position.

FIG. 3 shows the tool carrier of FIG. 2 during the transition from a transfer position into a cleaning position.

FIG. 4 shows the tool carrier of FIG. 2 in a cleaning position.

FIG. 5 shows the tool carrier of FIG. 2 when reaching a joining position.

FIG. 6 shows the tool carrier of FIG. 2 during the generating of a welding arc.

FIG. 7 shows the tool carrier of FIG. 2 after carrying out a welding movement.

DETAILED DESCRIPTION OF THE PREFERRED EMBODIMENTS

Figure 1:
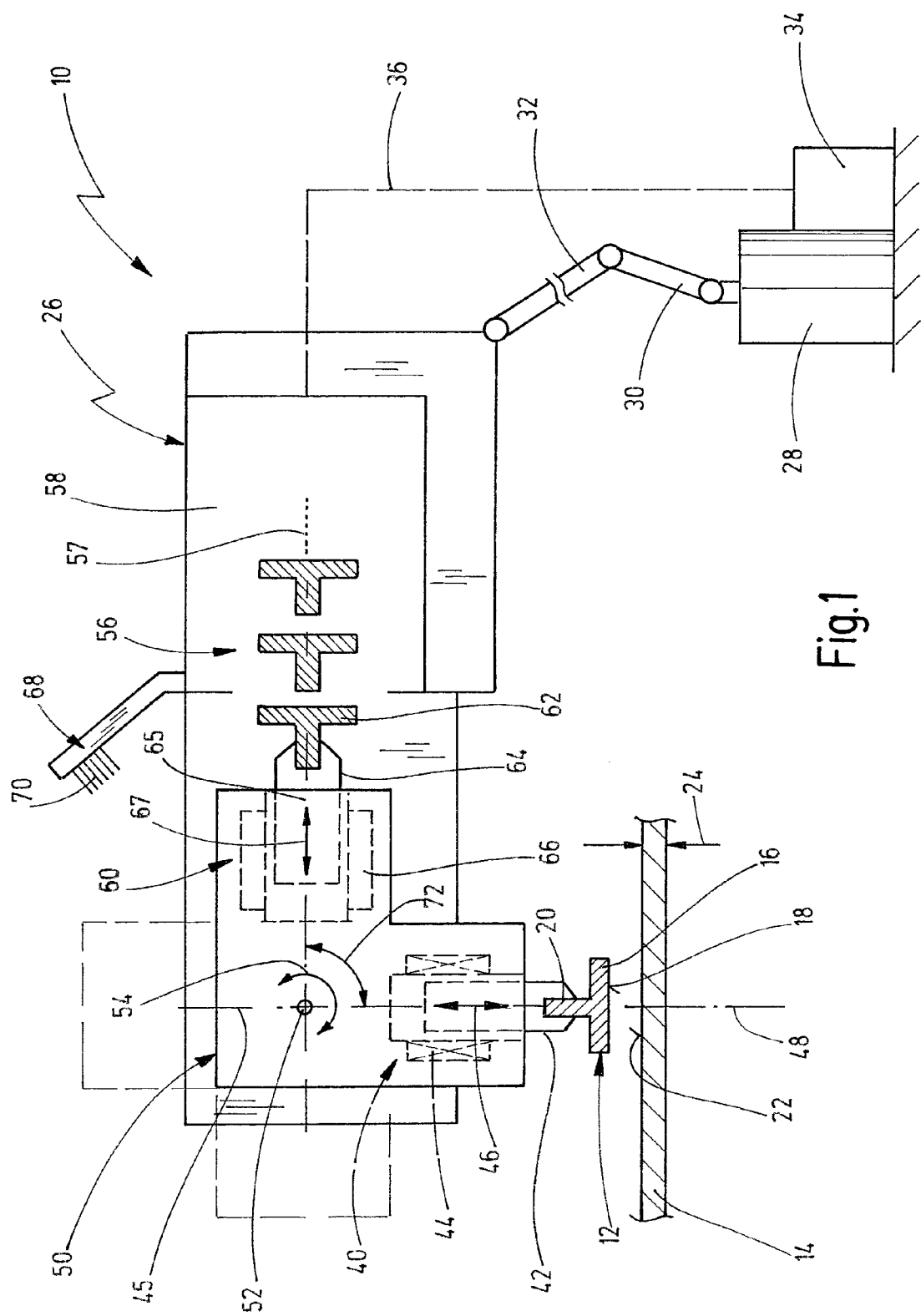
FIG. 1 shows a schematic representation of an embodiment of a joining apparatus according to the invention.

FIG. 1 shows a schematic representation of an embodiment of a joining apparatus according to the invention in the form of a stud welding apparatus which is designated in general by 10.

The welding apparatus 10 serves for the purpose of welding fastening elements 12 such as, for example, studs, on workpieces 14 such as, for example, metal sheets. The fastening elements 12 and/or the workpieces 14 can be produced from a metal material, for example steel, in particular, however, from a light metal such as aluminium. The fastening elements 12 have in each case a flange 16, on the underside of which a welding surface 18 is realized. On the upper side of the flange 16, the fastening elements 12 have a shank 20 which is preferably realized integrally with the flange 16. The workpiece 14 can be produced, in particular, from a sheet metal material which has a thickness 24 of less than or equal to 2 mm, in particular of less than or equal to 0.9 mm. The workpiece 14 has on an upper side a welding surface 22, the form of which corresponds approximately to the welding surface 18 of the flange 16.

The welding apparatus 10 has a welding (or joining) head 26 which can be manually guided, but which can be guided in particular by a robot 28. The robot 28 can have, for example, a first arm 30 and a second arm 32, the welding head 26 being mounted on the end of the second arm. By means of the robot 28, the welding head 26 can be moved three-dimensionally in space in an extensively free manner. The welding head 26 is preferably supplied with power by means of the robot 28. Welding power and process control are provided or carried out by a control and power source 73. The control and power source 73 can form one unit with a supply device 34. In addition, the welding apparatus 10 can have a fastening element supply device 34 which is also arranged in a stationary manner and can be connected, for example, to the welding head 26 by means of a hose 36. As an alternative to this, the fastening element supply device 34 can have a transfer station, from which the welding head 26 can fetch one or preferably a plurality of fastening elements which are then stored temporarily in a magazine of the welding head 26.

A welding tool 40, which has a holding device 42 for in each case one fastening element 12, is mounted on the welding head 26. The holding device 42, in this case, is preferably realized such that a fastening element can be inserted into the holding device 42 from the front and can be held there securely during a welding process. The welding tool 40 additionally includes a drive device 44, by means of which the holding device 42 is movable along a first axis 45 in order to be able to carry out, for example, a stud welding process using the lift ignition method. The corresponding movement direction is shown in FIG. 1 by 46.

The welding tool 40 can be fastened rigidly on the welding head 26. In the present case, the welding tool 40 is mounted on a tool carrier 50 which is mounted on the welding head 26 so as to be rotatable about an axis of rotation 52, which is aligned at right angles to the first axis 45. A rotary tool carrier drive 54, which is indicated in a schematic manner and can be formed, for example, by an electric motor, is provided on the welding head 26 for rotating the tool carrier 50.

A transfer section 56, from which fastening elements can be transferred along a transfer axis 57 into the holding device 42, is provided on the welding head 26. The transfer section 56 has associated therewith a magazine 58, in which a plurality of fastening elements can be received.

FIG. 1 shows the tool carrier 50 in a rotary position which corresponds to a welding position where the first axis 45 is aligned with a welding axis 48, which is at right angles on the workpiece 14. To take on a fastening element 12 at the transfer section 56, the tool carrier 50 is rotated out of the position shown in FIG. 1 such that the first axis 45 is aligned with a transfer axis (not shown in any detail) of the transfer section 56.

The welding head 26 additionally has a cleaning arrangement 60 which serves for cleaning the welding surface 22 of the workpiece 14. The cleaning arrangement 60 has a cleaning electrode 62, which can be similar in shape to a fastening element 12 or, in a preferred variant, can be formed by a fastening element 12 itself. The cleaning arrangement 60 has a cleaning electrode holding device 64, by means of which a cleaning electrode 62 can be held. The cleaning electrode holding device 64 is aligned along a second axis 65. The cleaning electrode arrangement 60 can be fastened rigidly on the welding head 26, however, in the present case it is mounted on the tool carrier 50. The cleaning electrode holding device 64, in this case, can be secured in a rigid manner on the tool carrier 50. However, it is preferred when the cleaning electrode holding device 64 is displaceable on the tool carrier 50 along the second axis 65 by means of a cleaning electrode drive device 66, as is indicated in FIG. 1 by a direction of movement 67.

FIG. 1 also shows that an electrode purging device 68, which can be realized, for example, as a mechanical purging device and in particular can include a brush 70, can be provided on the welding head 26. The purging device 68, in this case, is preferably arranged such that a cleaning electrode 62, held by the cleaning electrode holding device 64, is cleaned in a mechanical manner on its side pointing away from the holding device when the tool carrier 50 is displaced such that the cleaning electrode 62 is moved past the brush 70.

In addition, FIG. 1 shows that the first axis 45 and the second axis 65 are aligned with respect to each other at an angle 72 which is preferably greater than 0° and preferably less than or equal to 90°. FIG. 1 shows a variant at an angle 72 of 90° in order to be able to show the invention better. However, it is preferred when the angle 72 is less than 90° in such a manner that the drive device 44 and the cleaning electrode drive device 66 move closer together in the circumferential direction. In a preferred variant, said drive devices can also be integrated with each other.

The method of operation of the welding apparatus 10 of FIG. 1 is explained in more detail below by way of FIGS. 2 to 7. In this case, FIGS. 2 to 7 in each case show a schematic representation of a tool carrier 50, where the axes 45, 65 are aligned at a 90° angle. When the angle 72 is smaller, the extent of the movement of the tool carrier 50 can be reduced in a corresponding manner.

FIG. 2 shows the tool carrier 50 in a position where the first axis 45 is aligned with the transfer axis 57 in order, in this way, to take on a fastening element 12 from the transfer section 56. The position shown in FIG. 2 is also designated as the transfer position U. FIG. 2, in this case, additionally shows that the cleaning electrode 62' (which in the present case is shown as a bar-shaped electrode) and the fastening element 12 can be connected in parallel to the same power supply source or current source 73, which is preferably realized such that it can provide direct current in two polarities, which means that the current source is indicated schematically as an alternating current source.

In FIG. 3, the tool carrier 50 is rotated clockwise out of the position shown in FIG. 2. This means that the cleaning electrode 62' comes into contact with the cleaning electrode purging device 68 including brush 70.

The tool carrier 50 is rotated further clockwise out of the position shown in FIG. 3 until the cleaning electrode 62' is arranged above the welding surface 22 in which, therefore, the second axis 65 is aligned with the welding axis 48. The fastening element 12, in this connection, is rotated past the welding point of the workpiece 14. The cleaning electrode 62' is moved over the brush 70 during said rotational movement and is relieved of the smut deposits from the previous cleaning processes.

In the cleaning position R shown in FIG. 4, the cleaning electrode 62' is first of all lowered by means of the cleaning electrode drive device 66 until the cleaning electrode 62' contacts the workpiece 14. A current is then applied via the current source 73, the current being a direct current with a polarity according to which the workpiece 14 preferably has the negative polarity. FIG. 4 indicates that the workpiece 14 is connected to a frame 75. In this case, the polarity is correspondingly set by the current source 73. Once such a cleaning current has been set, the cleaning electrode 62' is moved away from the surface of the workpiece 14 by means of the cleaning electrode drive device 66 such that a cleaning arc 74 is struck. Electrons are extracted from the workpiece 14 by the cleaning arc, as a result of which the temperature of the workpiece 14 rises in the region of the welding surface 22. Said increase in temperature gives rise to partial combustion or evaporation of contaminants on the surface of the workpiece 14, such as, for example, solid lubricant and/or deep-drawing oil or the like. Sometimes residue of said combustion process is deposited on the cleaning electrode 62', which in the present case has a positive polarity. By selecting the polarity, it can consequently be ensured that the welding surface 22 of the workpiece 14 is cleaned and possible contaminants are essentially deposited on the electrode surface of the cleaning electrode 62'.

Proceeding from the cleaning position shown in FIG. 4, the tool carrier 50 is then rotated back anticlockwise until the first axis 45 is aligned with the welding axis 48, that is to say the fastening element 12, which has been taken on beforehand, is arranged above the welding surface of the workpiece 14. The position shown in FIG. 5 is designated in the present case as welding position S.

A stud welding process using the lift ignition method or, as shown in the present case, using the lift ignition welding method, is then carried out in a manner known per se. In this case, the fastening element 12 is first of all lowered onto the workpiece 14 by means of the drive device 44. A pilot arc, which preferably has an opposite polarity to the cleaning current, is then switched on.

FIG. 6 shows that once the fastening element 12 has been lifted up again, an arc has been struck, the current then being increased from the pilot current to a welding current which is significantly higher than the pilot current such that a welding arc 76 is generated, as is indicated in a schematic manner in FIG. 6. The welding arc 76 is preferably realized such that the welding surfaces 18, 22 opposite each other are at least partially melted. The fastening element 12 is then lowered onto the workpiece 14 once again by means of the drive device 44, preferably as far as under the surface of the workpiece 14. As a result of this, the melts of the fastening element 12 and of the workpiece 14 are mixed. In addition, a short-circuit occurs such that the current source 73 is switched off. The overall melt solidifies and the fastening element 12 is connected to the workpiece 14 in a positively bonded manner, as is shown in FIG. 7. The tool carrier 50 can now be rotated once again anticlockwise out of the position shown in FIG. 7 in order to take on another fastening element 12 from the transfer section 56, that is to say into the transfer position U shown in FIG. 2.

In the transfer position U it is additionally possible to exchange the cleaning electrode 62' as required. In so far as the cleaning electrode 62 is formed by a fastening element 12, as in the case of the embodiment shown in FIG. 1, the cleaning electrode in the form of the fastening element 12 can also be ejected initially at a suitable point and a new cleaning electrode in the form of a fastening element can be taken on by the tool carrier 50 being rotated such that the second axis corresponds with the transfer axis (a position between the two positions of FIGS. 3 and 4).

Figure 8:
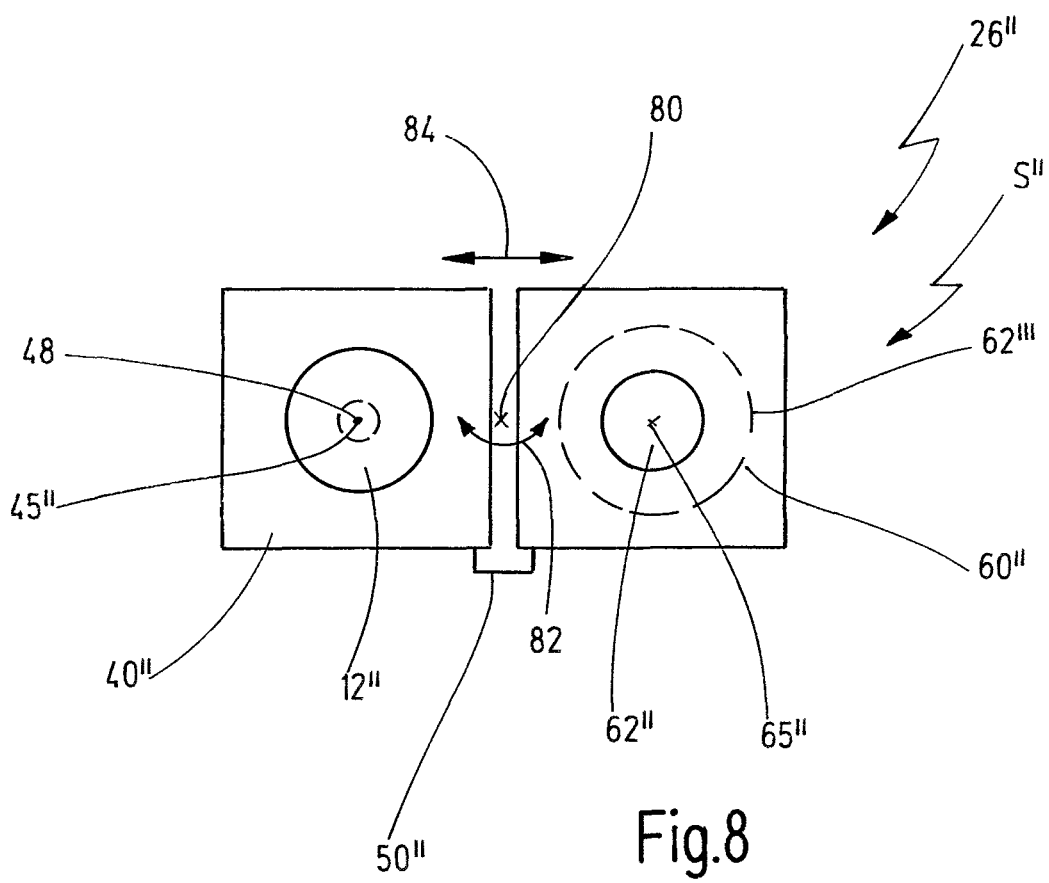
FIG. 8 shows a top view of an alternative embodiment of a tool carrier.

FIG. 8 shows a further embodiment of a welding head 26" with a mobile tool carrier 50" thereon. A welding tool 40", the first axis 45" of which in FIG. 2 coincides with the welding axis 48, is arranged on the tool carrier 50". A cleaning arrangement 60", the second axis 65" of which is arranged parallel to the first axis 45", is also arranged on the tool carrier 50". In this case, FIG. 8 shows a view of the tool carrier 50" from below in the direction of the welding axis 48.

In one variant, the tool carrier 50" is mounted such that it is rotatable about an axis of rotation 80 which is aligned parallel to the first axis 45" and the second axis 65" and preferably lies precisely between said two axes. In this case, the cleaning position R can be set up by the tool carrier 50" being rotated about 180°. A corresponding rotary drive 82 is indicated in a schematic manner in FIG. 8.

In an alternative embodiment, the tool carrier 50" is provided so as to be displaceable in a longitudinal direction by means of a displacement drive 84. The axis along which the tool carrier 50" can be displaced by means of the displacement drive 84 preferably lies parallel to a virtual connecting axis between the first axis 45" and the second axis 65". The displacement drive 84 can be dispensed with when the movement to be carried out by the displacement drive is able to be carried out by the robot itself.

It is obvious that even in the case of the tool carrier 50", apart from the welding position S (which is shown in FIG. 8) and a cleaning position R which can be set up by means of the rotary drive 82 or the displacement drive 84, a transfer position can also be approached in so far as the tool carrier 50" is realized in a corresponding manner.

The rotary drive 82 and the displacement drive 84 can be electromotive, electromagnetic or even pneumatic drives. The rotary drive 54 of the embodiment of FIG. 1 can also be an electromotive, an electromagnetic or a pneumatic drive.

The drive device 44 can be formed, for example, by a linear motor or by a combination of a lifting magnet and a spring. In a corresponding manner, the cleaning electrode drive device 66 can be formed by a linear motor or by a combination of a lifting magnet and a spring arrangement. The cleaning electrode drive device 66 can also be driven by a pneumatic drive.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A welding apparatus for joining a weldable fastening element onto a workpiece along a welding axis by a welding process; the welding apparatus comprising:
    an electric welding power source;
    a fastening element holding device operable for holding the fastening element during the welding process;
    a first drive device operable for moving the fastening element holding device along a first axis;
    a cleaning electrode holding device for holding a cleaning electrode along a second axis different from the first axis;
    wherein the fastening element holding device and the cleaning electrode holding device are mounted on a common tool carrier;
    wherein the tool carrier and a tool carrier drive motor are mounted on a joining head, and the tool carrier drive motor is operable to move the tool carrier on and relative to the joining head from a joining position to a cleaning position, and in the joining position the first axis is aligned with the welding axis, and in the cleaning position the second axis is aligned with the welding axis; and
    wherein the cleaning electrode held by the cleaning electrode holding device is connectable to the electric welding power source.

2. A welding apparatus according to claim 1, wherein the tool carrier drive motor is a rotary drive.

3. A welding apparatus according to claim 1, wherein the tool carrier drive motor is a linear drive.

4. A welding apparatus according to claim 1, wherein the tool carrier is movable by the tool carrier drive motor into a transfer position in which a fastening element can be transferred from the joining head into the fastening element holding device.

5. A welding apparatus according to claim 1, and further comprising a second drive device operable for moving the cleaning electrode holding device along the second axis.

6. A welding apparatus according to claim 1, wherein between the first axis and the second axis is define an angle which measures between 15° and 90°.

7. A welding apparatus according to claim 1, wherein between the first axis and the second axis is define an angle which measures between 180° and 0°.

* * * * *